(12) United States Patent
Fields, Jr. et al.

(10) Patent No.: US 6,476,344 B1
(45) Date of Patent: Nov. 5, 2002

(54) LASER WELDING SYSTEM

(75) Inventors: Donald R. Fields, Jr., Troy; James Foley, Marysville; Darin Morris, Urbana; Frank Godsil, Marysville, all of OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/563,989

(22) Filed: May 3, 2000

Related U.S. Application Data

(62) Division of application No. 09/262,248, filed on Mar. 4, 1999, now Pat. No. 6,204,469.

(51) Int. Cl.⁷ .............................................. B23K 26/20
(52) U.S. Cl. ................................................ 219/121.63
(58) Field of Search ....................... 219/121.63, 121.64, 219/121.78, 121.79, 121.8, 121.81, 121.82

(56) References Cited

U.S. PATENT DOCUMENTS

| | | | |
|---|---|---|---|
| 4,125,755 A | 11/1978 | Plamquist | 219/121 L |
| 4,462,046 A | 7/1984 | Spight | 358/101 |
| 4,578,554 A | 3/1986 | Coulter | 219/121 LC |
| 4,765,532 A | 8/1988 | Uomoti et al. | 228/212 |
| 4,814,576 A | 3/1989 | Morita et al. | 219/121.6 |
| 4,827,100 A * | 5/1989 | Frings et al. | 219/121.64 |
| 4,872,940 A | 10/1989 | Strum et al. | 156/379.8 |
| 4,973,817 A | 11/1990 | Kanno et al. | 219/121.63 |
| 5,030,313 A | 7/1991 | Takeda et al. | 156/389.9 |
| 5,064,991 A | 11/1991 | Alborante | 219/121.63 |
| 5,115,115 A | 5/1992 | Alborante | 219/121.63 |
| 5,142,118 A | 8/1992 | Schlatter | 219/121.63 |
| 5,169,051 A | 12/1992 | Noe | 228/5.7 |
| 5,190,204 A | 3/1993 | Jack et al. | 228/5.7 |
| 5,229,571 A | 7/1993 | Neihesel | 219/121.63 |
| 5,272,312 A | 12/1993 | Jurca | 219/121.63 |
| 5,325,443 A | 6/1994 | Beatty et al. | 382/8 |
| 5,328,083 A | 7/1994 | Peru et al. | 228/5.7 |
| 5,451,742 A | 9/1995 | Nishio et al. | 219/121.64 |
| 5,502,292 A | 3/1996 | Pernicka et al. | 219/121.64 |
| 5,510,597 A | 4/1996 | Kampmann et al. | 219/137 R |
| 5,533,146 A | 7/1996 | Iwai | 382/150 |
| 5,580,636 A | 12/1996 | Kampmann et al. | 428/119 |
| 5,586,139 A | 12/1996 | Takenaka et al. | 372/99 |
| 5,591,360 A * | 1/1997 | Mombo-Caristan | 219/121.64 |
| 5,595,670 A * | 1/1997 | Mombo-Caristan | 219/121.64 |
| 5,603,853 A * | 2/1997 | Mombo-Caristan | 219/121.64 |
| 5,607,605 A | 3/1997 | Musasa et al. | 219/121.64 |
| 5,616,261 A | 4/1997 | Forrest | 219/121.63 |
| 5,624,585 A | 4/1997 | Haruta et al. | 219/121.63 |
| 5,665,255 A | 9/1997 | Busuttil | 219/121.63 |
| 5,681,490 A | 10/1997 | Chang | 219/121.64 |
| 5,724,712 A | 3/1998 | Bishop | 29/430 |
| 5,728,992 A | 3/1998 | Swida | 219/121.64 |
| 5,742,504 A | 4/1998 | Meyer et al. | 364/188 |
| 5,760,365 A | 6/1998 | Milewski et al. | 219/121.64 |

FOREIGN PATENT DOCUMENTS

| | | |
|---|---|---|
| JP | 59174289 | 10/1984 |
| JP | 62118994 | 5/1987 |
| JP | 1058170 | 3/1998 |

OTHER PUBLICATIONS

Mombo–Caristan, Koch & Prange, "Seam Geometry Monitoring for Tailor Welded Blanks", ICALEO, pp. 123–132, 1991.

* cited by examiner

*Primary Examiner*—Samuel M. Heinrich
(74) *Attorney, Agent, or Firm*—Alan T. McDonald; Vince Ciamacco; Standley & Gilcrest LLP

(57) ABSTRACT

The present invention relates generally to an improved laser welded work piece, such as an automotive body panel, and a system and method for the manufacture thereof. The invention is also directed to an improved system for manufacturing the welded work piece including an improved laser welder and a laser weld inspection device and system.

12 Claims, 10 Drawing Sheets

LASER WELDING SYSTEM

CROSS REFERENCE TO RELATED APPLICATIONS

This application is a divisional of U.S. application Ser. No. 09/262,248, filed Mar. 4, 1999 entitled "Laser Welding System" now U.S. Pat. No. 6,204,469.

BACKGROUND OF THE INVENTION

1. Field of the Invention

The present invention relates generally to a new automated laser welding system configured to produce, for example, an improved welded work piece, such as an automotive body panel, and a system and method for the manufacture thereof that includes an improved laser welder and a visual weld inspection device. The invention also relates to a method for performing an automated quality control inspection of a laser weld.

2. Background

In the past, welded work pieces such as body panels for use in the automotive vehicle industry were made by stamping or drawing the panel from either a single blank of a ductile sheet metal material, including steel, or from a plurality of such blanks that were previously welded together. Either type of welded work piece or body panel usually required the addition of stiffeners and pads welded to sections of the panel to improve its structural rigidity. The added stiffeners and pads were also needed to increase the thickness of the work piece in predetermined locations so that various structural and fastening assemblies could be fastened and welded to the panel without damage during the fastening or welding process. The addition of the stiffeners and pads increased the weight of the work piece and also increased the total manufacturing time needed to fabricate the work piece. The work pieces were often formed, drawn, or stamped into a final shape to have a three-dimensional shape corresponding to the overall design of the automotive vehicle.

As a result of the number of manufacturers in the field, the automotive vehicle industry is very competitive with respect to, among other things, quality, raw material costs, and manufacturing times required to completely fabricate and assemble a vehicle. To remain competitive, manufacturers have continuously expended enormous resources to contain, if not reduce, material costs by reducing part weight, part count, and manufacturing time while maintaining the needed high degree of quality. A considerable amount of such resources have been directed to improving and automating routine tasks such as the fastening together of various work pieces and vehicle parts such as, for example, body panels for fenders, quarter panels, trunk lids, engine compartment hoods, vehicle doors, and other various components.

Previously, multi-part sheet metal blanks have been welded together into a single work piece before being stamped into a final shape. These blanks were prepared by a variety of fastening techniques including chemical, arc, and $CO_2$ laser welding, riveting, bolting, cold forming, and similar methods. Of particular interest in recent years is the use of more efficient laser welding using $CO_2$ lasers in automated, numerically controlled manufacturing processes. Such laser welding can be accomplished for joining together sheet metal blanks at a common seam by means of, for example, a lap weld, or a butt weld. Butt welds are often preferred because only a single seam needs to be welded in contrast to lap joint which usually require that two seams be welded.

Many problems have been associated with the use of $CO_2$ lasers including the requirement that less than optimum welding speeds must be used because of the poor absorption by steel work pieces of the energy produced by the $CO_2$ laser. Also, laser welded joints can be plagued with problems despite the use of an appropriate weld speed if a manufacturer does not carefully prepare the work pieces or is otherwise not attentive to the intricacies and pitfalls of laser welding processes. Problems are even more prevalent when the blanks to be welded together are of dissimilar thickness. Such problems include, for example, mismatch between the welded parts along the joint on at least one exterior surface, poor weld bead dimensions or hardness, cracks, poor weld bead continuity across the length of the weld, and pinholes formed in the weld bead. Many of these welding problems are difficult to avoid and even more difficult to detect. More often than not, detection of such problems can only be accomplished by a slow and tedious visual inspection. Further, some of these problems, such as cracks, weld spatter, and pinholes, can only be detected through destructive testing such as by tension and shear tests, micrographic cross sectional analysis, etch and penetrant dye inspections, and formability testing to ensure the welded blanks of the work piece can be drawn or stamped without failure anywhere along the welded joint.

These problems are especially apparent when steel work pieces, such as welded components for an automotive body or door panel, are to be butt welded together for form a larger, single work piece or door panel blank that can be later stamped or drawn into a shaped panel ready for painting and attachment to the vehicle. In many cases such welds are straight line weldments that could be completed faster if an improved laser welding technique were available. Additionally, it would be desirable to have an automated manufacturing assembly line wherein multiple work pieces could be automatically introduced to the laser welding apparatus to minimize the risk of injuries to workers from reflected laser energy. Further, such welding manufacturing processes could be made more efficient if a technique existed to speed up the post-weld inspection process.

There have been attempts to develop a viable method for laser welding inspection. U.S. Pat. No. 5,607,605 discloses such a method, which utilizes a CCD (Charge Coupled Device) camera to capture an image of the plasma generated when a laser beam contacts an object to be welded. The image is then sent to an image processing device, which measures a selected particular feature of the plasma cloud. The measurement is further transferred to a distinction device, which compares the measurement with a reference value to determine if the laser welding condition, and thus the weld, is acceptable.

Electro-optical detection of laser welding conditions has also been employed as an inspection method. U.S. Pat. No. 5,272,312 recites a method for the inspection of a laser weld, wherein the area of the material in contact with the laser beam, referred to as the laser processing spot, is projected onto at least one photodetector such as photodiode which detects the amount of liquid material ejected from the weld pool during the welding process. The signal from the photodiode can be converted into an electrical signal, which may then be sent to a processing unit for determination of the size and location of voids or pores in the weld seam. In one embodiment, this reference discloses the detection of ultraviolet radiation present in the plasma cloud.

Laser welding generates particular signals which may be monitored to determine the quality of a weld. U.S. Pat. No. 5,681,490 discloses that sensors such as photodiodes, phototransistors, photo darlingtons, pyroelectric detectors, microphones, and infrared and thermal detectors can be positioned to monitor various stages of the welding process. Such sensors may be utilized to monitor light, sound, gas, smoke, temperature, etc. The signals generated by these sensors may then be analyzed by a computer to predict the weld quality.

None of the prior art, however, discloses an apparatus or method utilizing direct inspection of the weld bead to determine the quality of a laser weld. The prior art methods generally depend upon the use of unstable process indicators to ascertain the condition of the weld, often requiring the monitoring and analysis of a multitude of signals to reach a conclusion regarding weld quality.

The automotive industry is in need of a laser welded work piece that contains fewer parts, has an optimally minimized weight, and that is produced through the use of an automated, laser welding manufacturing process. The welded work piece produced in accordance with the present invention, and the system and method for its manufacture, overcomes the deficiencies of the presently known methods for automated laser welding and inspection of welded work pieces.

SUMMARY OF THE INVENTION

In general, the present invention is directed to an improved laser welded work piece and an automated laser welding and visual inspection system and method configured to manufacture the work piece. The welded work piece incorporates a minimized gap that is designed to improve the structural properties of the laser weld. The new automated manufacturing system includes a robotically automated production line configured to prepare blank work pieces for welding by precision shearing at least one edge, and to precisely align the blanks and laser weld them together using a single or dual cell, high-speed, high-power laser. During welding, the laser weld is concurrently inspected by a visual inspection device to determine whether the welded work piece should be accepted or rejected. The operator can continuously supply palletized raw materials, such as pallets or skids of sheet metal blanks, to the production line without stopping or interrupting the automated production line. After welding, the system robotically sorts and re-palletizes the finished, welded work piece onto accepted work piece skids or onto rejected work piece skids. The operator can remove the accepted and rejected work pieces from the production line without stopping or interrupting the continuously running line.

THE WELDED WORK PIECE

The invention includes a welded work piece for use in manufacturing an automotive vehicle that incorporates a first blank of a steel sheet stock with a first thickness and having at least one first precision sheared edge, and a second blank formed from a steel sheet stock material of a second thickness having at least one second precision sheared edge. The first and second precision sheared edges are produced in the respective first and second blanks to form a minimized gap between the edges before welding. The edges are laser welded using the apparatus disclosed herein, to form a beaded seam that permanently joins the respective first and second blanks. In a method for manufacturing the improved welded work piece, first and second blanks of a sheet stock steel are selected to be of similar or dissimilar respective thickness and respective precision sheared edges. The edges are positioned on a flat welding surface and tightly compressed together in an abutting relationship to form a minimized gap between the edges. The edges are then laser welded together to form a beaded seam that permanently joins the blanks together to form the welded work piece.

There is thus disclosed a welded work piece for use in manufacturing an automotive vehicle, comprising first and second sheet metal blanks, each formed with at least one precision sheared edge and having similar or dissimilar thickness. The blanks form a minimized gap when the respective at least one precision sheared edges are positioned in an abutting relationship A continuous wave laser butt welded seam fixedly joins the blanks together along at least one of the respective precision sheared edges.

THE SYSTEM

Another aspect of the present invention is directed to a system for manufacturing a welded work piece. The system includes at least one articulating arm feeder robot, configured to retrieve at least one sheet metal blank from a plurality of such blanks, from at least one of a plurality of feeder skids containing palletized sheet metal blanks. The arm is adapted to transport the individual blanks, one at a time, from the skid to a load position on a magnetic conveyor. Each of the blanks are formed with at least one joining edge. In applications where blanks of dissimilar thickness or other dimensions are used, the blanks may either be stacked alternately on a single skid, or a second articulating arm feeder robot may be employed to retrieve a dissimilar blank from a second plurality of such blanks that are palletized on a second plurality of skids. The second robot arm operates cooperatively to feed the second, dissimilar blank onto the magnetic conveyer.

The magnetic conveyor of the system is adapted to receive from the feeder robot or robots at least two blanks. The conveyer is configured with blank locator devices adapted to precisely position them on the substantially flat conveyor bed. The blanks are proximally pre-positioned so each of the respective joining edges are substantially parallel. The magnetic conveyor is further configured to releasably restrain the positioned blanks into place and to move the blanks from the load position to a shear position.

The system also incorporates a precision shear device positioned about the shearing position of the magnetic conveyer. The shear device is configured with at least one upper stamping die that cooperates with at least one lower stamping platen to precisely shear at least one of the respective joining edges of each of the blanks. After shearing, the blanks are moved by the magnetic conveyer onto an idle station that temporarily stores the sheared blanks until they can be welded. The blanks are then conveyed by a second conveyer to a welding gantry located at the other end of the idle station.

The second conveyer moves the sheared blanks onto a laser weld bed of the welding gantry. The gantry includes a clamping and positioning assembly operative to releasably register and press the respective joining edges of the blanks flat against the weld bed and tightly together with the edges in an abutting relationship to form a minimized gap. The clamping mechanism is configured with a clamp assembly having multiple bars that clamp down on each blank to firmly press them against the laser weld bed. The positioning assembly includes a plurality of locator assemblies that push against one. or more of the non-joining edges of each blank to precisely locate the blanks so that the precision sheared edges are tightly pressed together. When so pressed together, the edges form a minimized gap or seam therebetween.

The system also includes a laser welder movably attached to the welding gantry. The laser welder may be configured with a weld head powered by a remote laser power unit. The weld head moves along the gantry and, when energized, projects a laser beam incident to and focused upon the gap or seam of the blanks to form a weld bead seam. The system also comprises a laser weld inspection device that is adapted to move along either in conjunction with or independently of the laser weld head to inspect to the weld bead seam. Once welded, an exit conveyor operates to remove the welded work piece from the laser weld bed. An articulating arm exit robot is also included that is configured to move the work piece from the exit conveyor to an exit station. If the inspection revealed that the weld was acceptable, the exit robot moves the welded work piece to one of a plurality of skids for work pieces that have passed the inspection. Otherwise, if the inspection revealed that the weld bead seam was not acceptable, the exit robot moves the defective welded work piece to one of a possible plurality of reject skids.

There is thus disclosed a system for manufacturing a welded work piece, comprising at least one articulating arm feeder robot, configured to retrieve at least one blank from at least one of a plurality of feeder skids of palletized sheet metal blanks. Each blank is formed with at least one joining edge, and the articulating arm feeder robot is adapted to transport the blank to a load position on a magnetic conveyor. The magnetic conveyor is adapted to receive from the feeder robot or robots at least two of the plurality of blanks and to precisely position them on a conveyor bed. The blanks are proximally pre-positioned so each of the respective joining edges are substantially parallel, and the magnetic conveyor is further configured to releasably restrain the positioned blanks into place and to move them from the load position to a shear position. The system further comprises a precision shear device, positioned about the shearing position of the magnetic conveyer, and configured with at least one upper stamping die that cooperates with at least one lower stamping platen to precisely shear at least one of the respective joining edges. There is also a welding gantry, spaced apart from the precision shear device and configured with a second conveyor having a laser weld bed and connected to the magnetic conveyer with an idle station therebetween. The second conveyer is configured to slidably receive the sheared blanks from the idle station and to move them onto the laser weld bed. The system also utilizes a clamping and positioning assembly operative to releasably register and press the respective joining edges of the blanks flat against the weld bed and tightly together in an abutting relationship to form a minimized gap. A laser welder is movably attached to the welding gantry, and has a weld head powered by a remote laser power unit to project a laser beam incident to and focused upon the gap for welding the blanks along the gap to form a weld bead seam. A laser weld inspection device is slidably coupled to the welding gantry and operative to inspect the weld bead. After inspection, an exit conveyor coupled to the second conveyor, removes the welded work piece from the laser weld bed. An articulating arm exit robot moves the work piece from the exit conveyor to an exit station, which is selected from the group of one of a plurality of accepted work piece. skids or a rejected work piece skid.

The system further includes a light curtain system that is configured to surround each of the plurality of the feeder and exit station skids to allow removal and replacement of empty feeder and full exit skids without the need to interrupt the operating manufacturing system. If an operator approaches any of the skids for removal and replacement, the light curtains signal the robots either directly or indirectly. In response, each of the robots is directed to another of the plurality of skids for purposes of retrieving unwelded blanks or outputting welded work pieces during the period of time that the light curtain is activated. Similarly, each of the skids or a skid holder unit incorporates a sensor that either signals that the skid is empty or full. If either of these conditions occurs, the robot is directed to use another of the plurality of skids.

There is further disclosed a method for manufacturing a welded work piece comprising the steps of: shearing a precision edge on a respective joining edge of a plurality of sheet metal blanks, using a precision shear device configured with at least one upper stamping die that cooperates with at least one lower stamping platen to perform the shearing operation; moving the plurality of precision sheared blanks together on a conveyor from the precision shear device to a laser weld bed of a welding gantry; precisely locating the blanks to register the precision sheared edges in a compressed, abutting relationship; clamping the respective joining edges of the blanks flat against the weld bed and tightly together in an abutting relationship to form a minimized gap; and laser welding the edges to form a beaded seam and to permanently join the blanks together.

THE LASER WELDER

In yet another aspect of the present invention, a single or multi-celled laser welder is described. The laser welder incorporates at least one laser weld head that is configured to movably project at least one laser beam onto a plurality of work pieces to weld them together. As described above, the work pieces are positioned so that the edges are tightly pressed together in an abutting relationship to form a seam or gap. The work pieces are welded together with a laser weld head that projects the laser beam incident to the gap with a compound angle. The compound angle is measured relative to the vertical direction substantially normal to the substantially flat sheet metal work pieces. A leading angle component of the compound angle is substantially in the direction of movement of the laser weld beam as the weld head moves across the blanks during welding. A leaning component of the compound angle is orthogonal to the leading angle and is substantially in the direction normal to the blanks and the gap and it leans to one side towards one of the blanks away from the vertical direction.

Thus, there is disclosed a laser welder for welding a plurality of work pieces, comprising a laser weld head configured to movably project a laser beam onto a minimized gap formed between a plurality of adjacent, substantially flat work pieces formed with respective precision sheared edges. The edges are positioned in an abutting relationship, and the laser weld head is operative to weld the edges by forming a weld bead seam between the edges. The laser welder further comprises a laser beam incident on the gap with a compound angle. The compound angle is measured relative to the vertical direction substantially normal to the work pieces, and includes a leading angle component substantially in the direction of movement of the laser weld beam, and a leaning component substantially in the direction normal to the gap and leaning towards one of the blanks away from the vertical direction.

There is further disclosed a multi-celled laser welder comprising a plurality of laser weld heads, each configured to movably project a laser beam onto a plurality of minimized gaps formed between a plurality of adjacent, substantially flat work pieces formed with respective precision sheared edges. The edges are positioned in an abutting relationship and the laser weld heads are operative to weld the edges by forming a weld bead seam between the edges. The laser beams are incident on the gaps with a compound angle. The compound angle is measured relative to the vertical direction substantially normal to the work pieces, and includes a leading angle component substantially in the direction of movement of the laser beams and a leaning component substantially in the direction normal to the gaps and leaning towards one of the blanks away from the vertical direction.

THE INSPECTION SYSTEM

The present invention is also directed to a specially designed vision system configured to inspect a laser weld bead in real time. When the focal point of a laser beam contacts a work piece, it generates intense heat which forms a molten weld pool. As the laser beam traverses the work piece, the weld pool left behind quickly cools to form a weld bead. A visual sensor, such as a CCD (Charge Coupled Device) or video camera follows the laser welding head to view the weld bead. Although in a preferred embodiment of the invention a visual sensor is affixed to and travels with the laser welding head, it should be realized that the visual sensor could also be detached and independently propelled. An image of the weld bead is captured by the visual sensor at a predetermined interval based on the velocity of the laser welding head and other factors. The image from the visual sensor is sent to an image processing board, which in conjunction with a coprocessor board, computer and the system software, compare the image to a list of predefined, preferred tolerances, which correlate with several established characteristics of the weld bead considered to be acceptable. If it is determined that the selected characteristics of the weld bead image are within the specified predefined tolerance limits, a signal is generated classifying the weld as acceptable. If it is determined that the image is outside the specified predefined tolerance limits, a signal is generated classifying the weld as defective.

Thus, there is disclosed a laser welding inspection system comprising a laser welding device, an image capturing device for capturing the image of a laser weld bead, and an image processing device in electronic communication with the image capturing device, for measuring at least one dimension of the laser weld bead image captured by the image capturing device. The system further comprises a distinction device, in electronic communication with the image processing device, for comparing the value of the at least one dimension of the laser weld bead image measured by the image processing device with a reference value, to determine the quality of the laser weld.

There is further disclosed a method of inspecting a laser weld, the method comprising capturing an image of a weld bead, measuring at least one dimension of the laser weld bead image, and comparing the value of the dimension of the laser weld bead image with a reference value to determine the quality of the laser weld.

Other features and advantages of the invention will become apparent from the following detailed description, taken in conjunction with the accompanying drawings, which illustrate, by way of example, the features of the present invention.

BRIEF DESCRIPTION OF THE DRAWINGS

Without limiting the scope of the present invention as claimed below and referring now to the drawings, wherein like reference numerals across the various views refer to identical, corresponding, or equivalent features and parts:

DETAILED DESCRIPTION OF THE PREFERRED EMBODIMENTS

The invention produces an improved welded work piece that is welded from a plurality of sheet metal blanks of substantially similar or dissimilar thickness, which are formed from materials such as steel, aluminum, and alloys. According to the invention, the plurality of blanks are laser welded together at speeds faster than previously possible with a much lower percentage of rejected work pieces. Before welding, the blanks are precision sheared along at least one joining edge. The precision shear ensures that when the sheared edges of the blanks are placed in an abutting relationship, a minimized gap, if any at all, will exist. The closely toleranced and minimized gap improves the final weldment and reduces the time needed to complete the manufacturing process.

Figure 1:
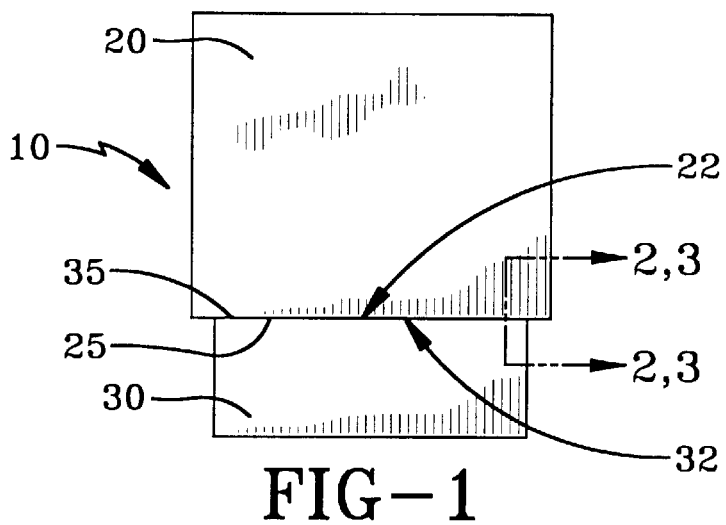
FIG. 1 is a planform view, in reduced scale, of a preferred embodiment of a welded work piece produced in accordance with the present invention.
Figure 2:
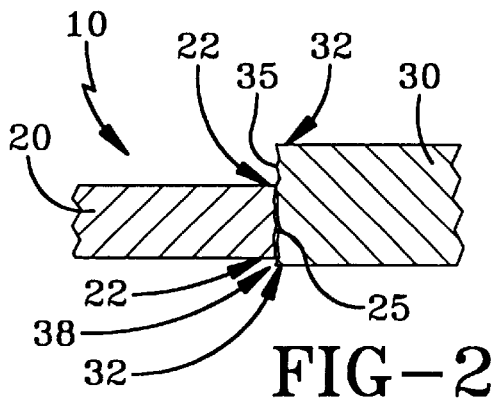
FIG. 2 depicts a rotated, partial, cross-sectional view taken along section line 2—2 of FIG. 1, in enlarged scale, of the work piece of FIG. 1 before welding.
Figure 2A:
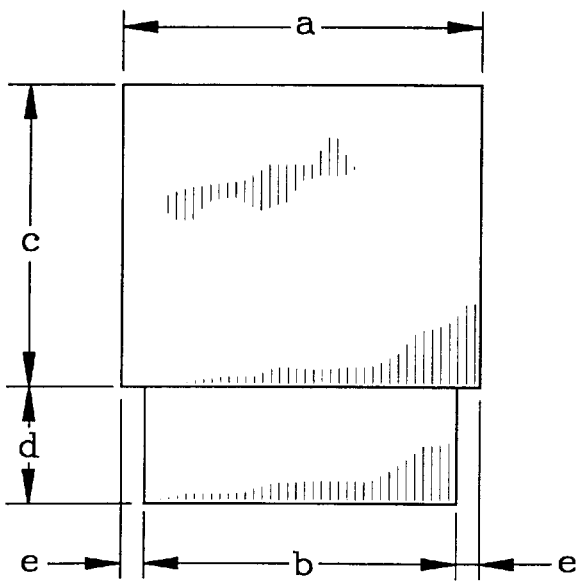
FIG. 2a depicts a dimensional representation of an illustrative example of the work piece of FIG. 2.

With reference to FIG. 1, an improved work piece 10 is shown having a first sheet metal blank 20 and a second sheet metal blank 30. The blanks 20, 30 each have at least one joining edge 22, 32 each formed with a precision sheared edge 25, 35, respectively. Prior to butt welding, the blanks 20, 30 are pressed flat onto a welding surface (not shown) with the precision sheared edges 25, 35, pressed tightly together. As can be understood with reference to FIGS. 2 and 2a, when the edges 25, 35 are so positioned, they are ideally in facing contact with one another over the entire length of the interface between them. However, under even the most controlled and the most tightly toleranced of manufacturing conditions, uninterrupted contact of the edges 25, 35 is unachievable, and some gaps 38, although very small, are experienced at the interface of the edges 25, 35. These gaps 38 are due to the normal manufacturing tolerances encountered with the manufacturing process and are always experienced during production. In the preferred embodiment, the gaps 38 between precision sheared edges 25, 35 are preferably between approximately zero and approximately 0.08 millimeters and more preferably less than 0.04 millimeters.

Figure 3:
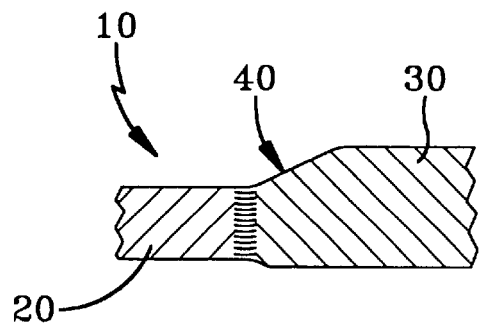
FIG. 3 is a rotated, partial, cross-sectional view taken along section line 3—3 of FIG. 1, in enlarged scale, of the work piece of FIG. 1 after welding.
Figure 3A:
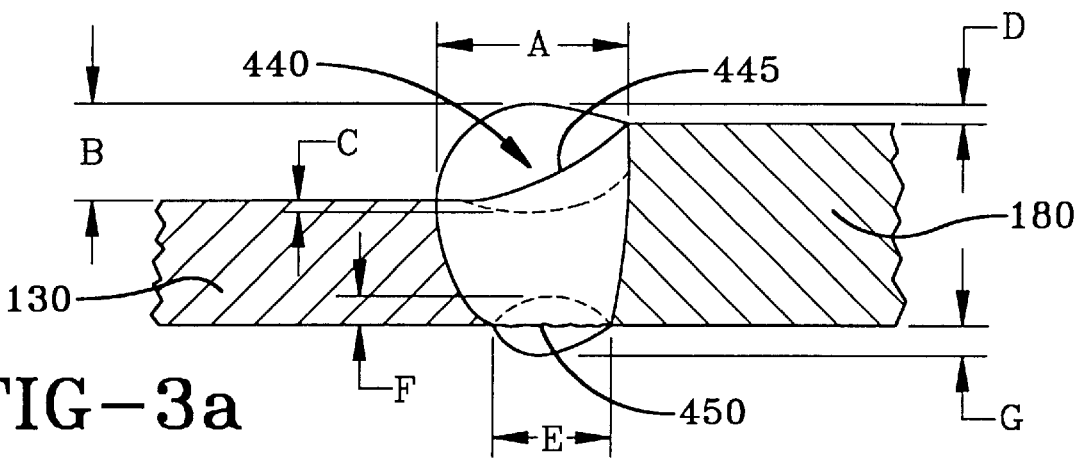
FIG. 3a is a schematic representation of another embodiment of the work piece of FIG. 3.
Figure 3B:
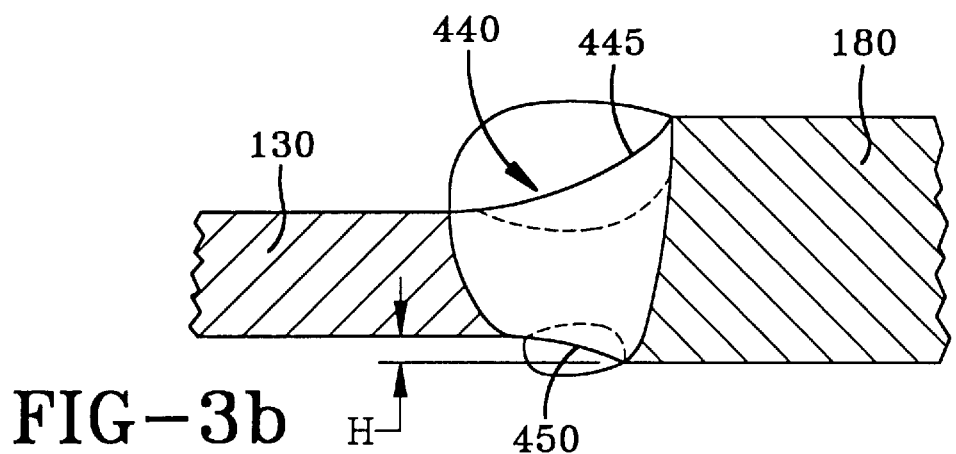
FIG. 3b is a schematic representation of another embodiment of the work piece of FIG. 3 wherein the lower surfaces of the welded work piece are misaligned.

These gaps 38 can cause problems with welded joints such as butt welds. This is because the gaps 38 can lead to less than optimum welds due to the development of macroscopic and microscopic cracks and micropores, among other irregularities and anomalies, in the weldment between the joining edges 22, 32. If not properly accounted for in the design, strength analysis, and manufacturing process, or if not otherwise minimized during the manufacturing process, these types of irregularities and anomalies can lead to increased numbers of rejected welded work pieces 10. Despite such anomalies and irregularities, the gaps 38 can be significantly minimized during the manufacturing process which, in turn, substantially reduces the number of rejected work pieces 10. The gaps 38 are minimized by precision shearing the joining edges 22, 32, to achieve the above gap dimensions, before welding. FIGS. 3, 3a, and 3b schematically represent the welded interface or weldment 40. The preferred characteristics of the weldment are described below with respect to the discussion of the laser weld inspection device of the present invention.

The preferred embodiment of a welded work piece produced in accordance with the present invention includes blanks 20, 30 of substantially similar or dissimilar thickness. For purposes of illustration but not limitation, the thickness for each blank 20, 30 can range preferably from between approximately 0.4 millimeters to approximately 2.0 millimeters, and more preferably from between approximately 0.7 millimeters to approximately 1.4 millimeters. In one embodiment of the invention, one blank thickness is between approximately 0.50 millimeters and approximately 0.75 and the other blank thickness is between approximately 1.25 millimeters and approximately 1.50 millimeters. As an example of such dissimilar thickness, the first blank 20 can be selected to have a thickness of approximately 0.7 millimeters while the second blank 30 can be selected to have a thickness of approximately 1.4 millimeters. Many various thickness arrangements of first and second blanks 20, 30 are possible. The preceding example is particularly effective for use in manufacturing a welded work piece suitable for applications where increased rigidity must be imparted to a portion of the work piece. This example is especially efficient in applications where the added rigidity must be accomplished without a corresponding increase in the part count or the part weight, as would occur if stiffeners, pads, or other structural supports were added to the work piece.

Although representative dimensions are set forth, they are presented only for purposes of demonstrating a particular embodiment of the present invention and not for purposes of limitation. One having ordinary skill in the art will understand that various types and thicknesses of steel, steel alloy, and other metal materials, are contemplated for use with the present invention.

Figure 4:
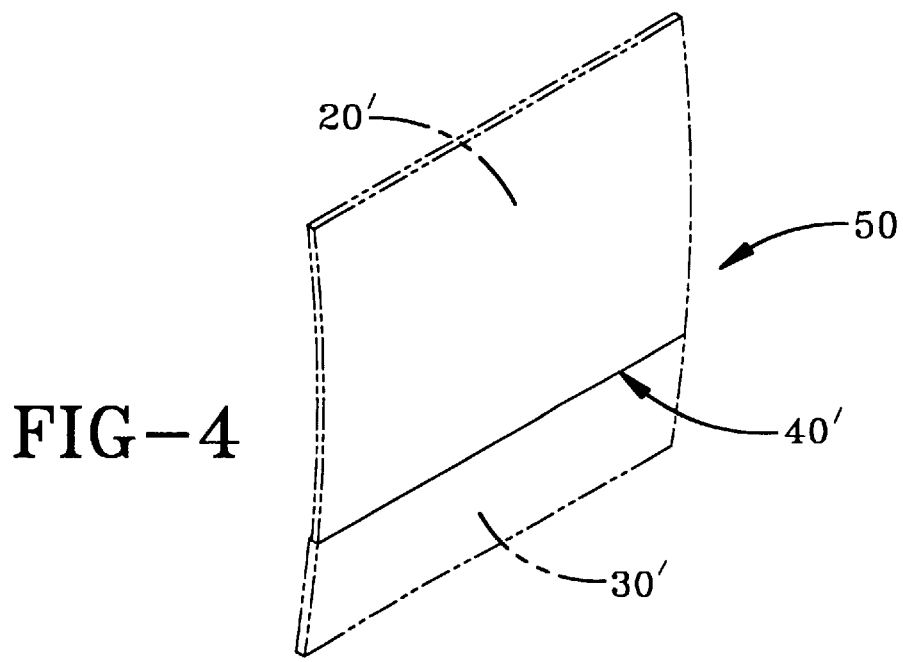
FIG. 4 is an elevated perspective view, in reduced scale, of a stamped body panel fabricated from the welded work piece of FIG. 1.

As a further illustrative example, the usefulness of the preferred embodiment is readily apparent in aeronautical or automotive applications. In aeronautical applications, structural rigidity must be accomplished with minimum possible weight and part count to minimize the overall aircraft weight and manufacturing cost. Similarly, in automotive manufacturing, where millions of copies of the same part are fabricated, minimized weight and part count can translate into substantial savings in material costs and manufacturing times. With reference to FIG. 4, a representative preferred embodiment of the improved welded work piece is shown as applied to the fabrication of a drawn or stamped body panel 50 configured for use in the automotive vehicle manufacturing industry. First and second blanks 20', 30' are welded together along weld seam 40' after precision shearing the respective joining edges. The improved welded work piece is then stamped or drawn into the desired shape of an automotive vehicle body panel.

SYSTEM DISCLOSURE

Figure 5:
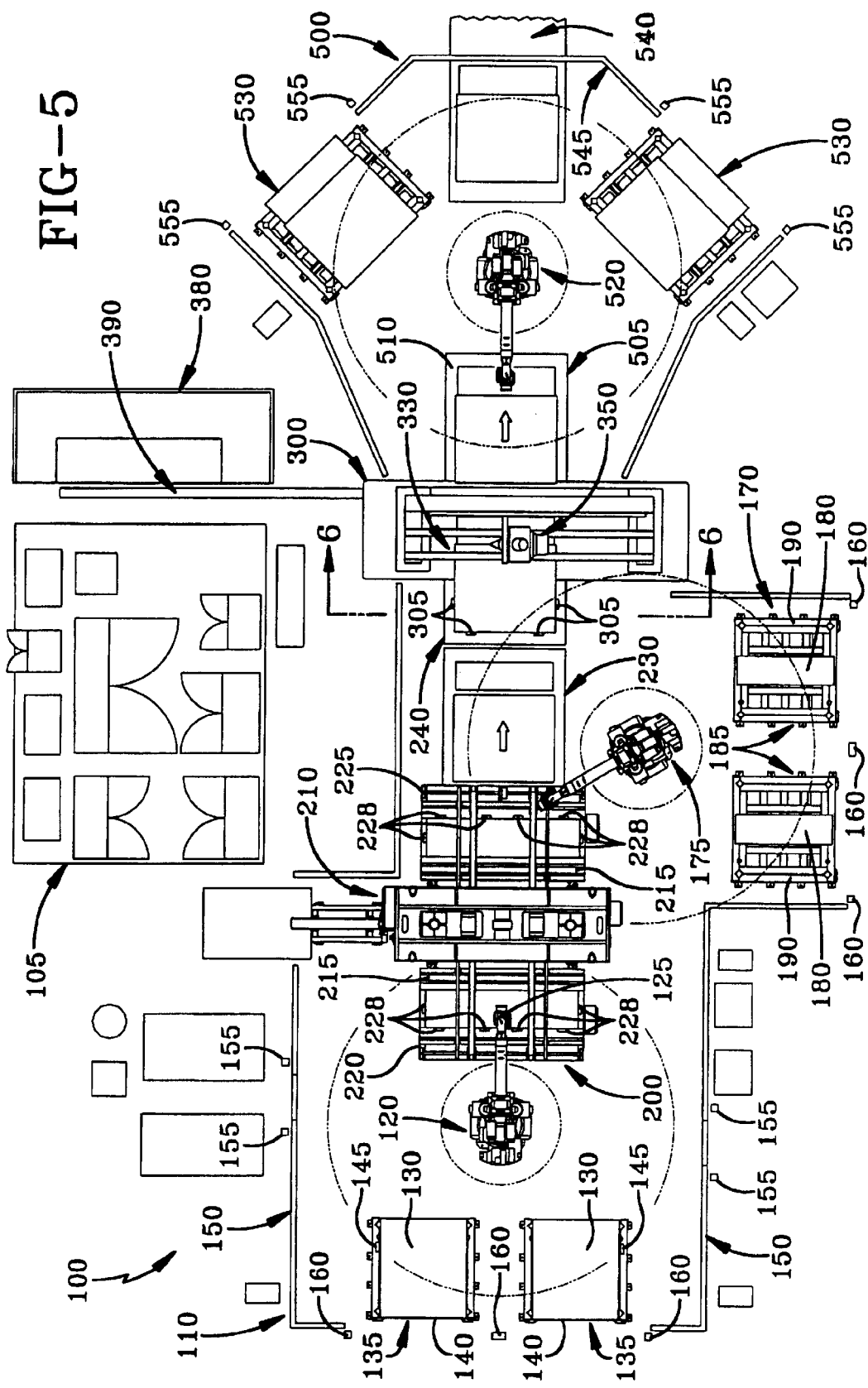
FIG. 5 is schematic top-view, in reduced scale, of the layout of a system for manufacturing the laser welded work piece of the present invention.

The present invention also provides a significant improvement over previously known welded work pieces and the system and method for their manufacture. With reference to FIG. 5, the invention includes an automated welded work piece manufacturing system 100 configured to robotically retrieve a plurality of blanks, to form at least one respective precision sheared edge on the blanks, to weld the blanks together, to inspect the weldment, and to robotically output the satisfactorily welded work pieces to an accepted station and the improperly welded work pieces to a rejected station.

Figure 9:
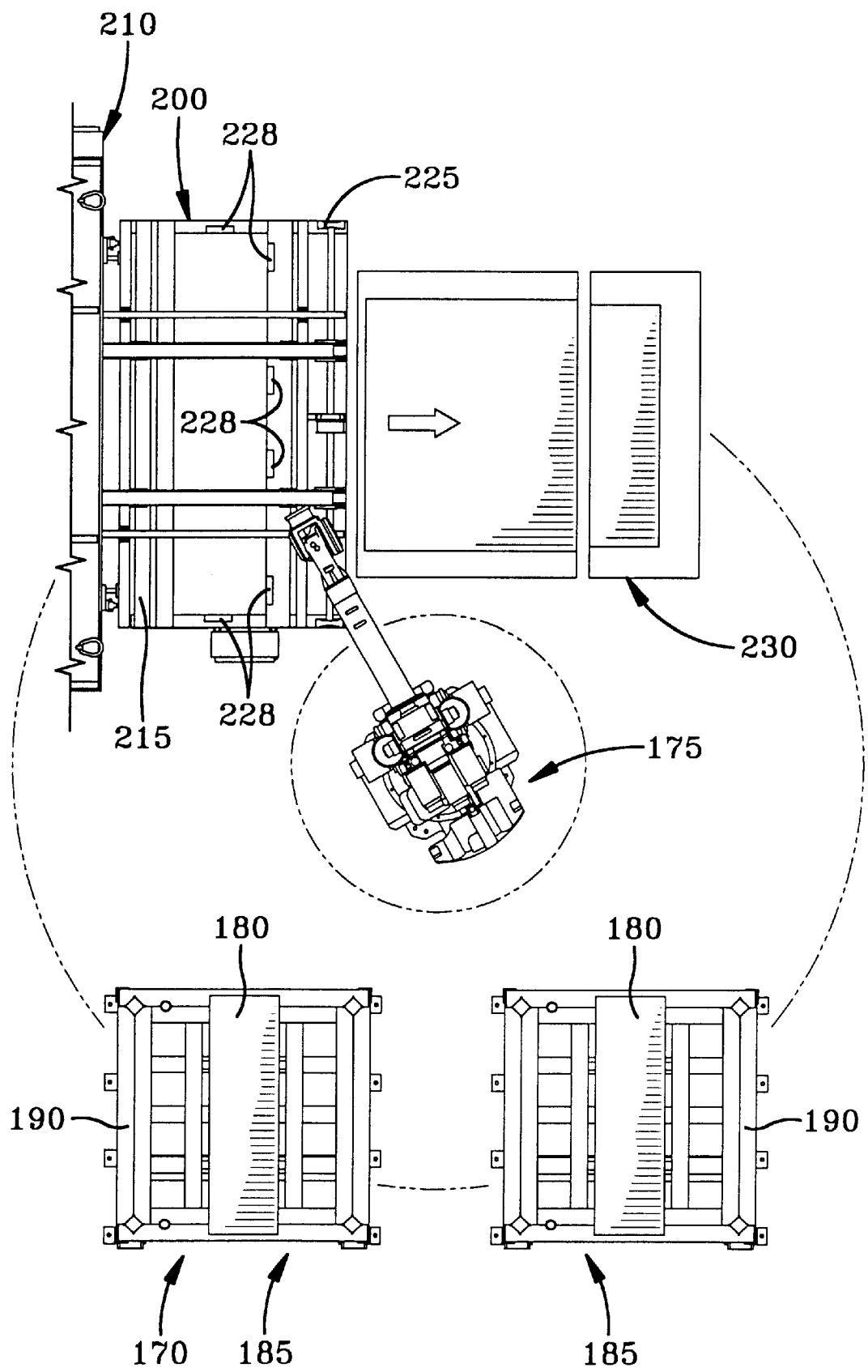
FIG. 9 is an enlarged view of a portion of FIG. 5 representing a plurality of the feeder skids, feeder robot arm, part of the magnetic conveyor, and part of the precision shear machine of the manufacturing system of the present invention.

The blanks to be welded are fed to the automated manufacturing system 100 by at least one of plurality of articulating arm feeder robots. The automated manufacturing system 100 includes one or more control computers 105 configured to communicate with, monitor, and/or control the various subsystems and components of the system 100. With reference to FIGS. 5 and 9, also included is at least one of a plurality of robotic stations that preferably include at least a first robotic feeder station 110 that incorporates a first articulating arm feeder robot 120 that is capable of variable operation speeds and of 1, 2, or 3 dimensional motion with articulation about substantially 2 to substantially 5 axes each ranging between approximately 5 to approximately 360 degrees. Although not required for purposes of the preferred embodiment, each robot may also incorporate a vertical and horizontal telescoping capability for added flexibility. The first robot 120 further includes a manipulator 125 configured to releasably capture a first sheet metal blank 130 of a plurality of blanks 135 for transport between at least two positions. Many types of suitable robots are commercially available and include the Model SK-120 industrial robot available from Motoman, Inc., of West Carrolton, Ohio.

Preferably, the first robot 120 retrieves the blank 130 from at least one of a first plurality of feeder pallets or skids 140 containing the plurality of palletized blanks 135. Typically, the first robot is configured to empty one skid at a time and then to begin removing blanks from the next available skid. The first robot 120 can be configured to retrieve a predetermined number of blanks 130 from the skid 140 before it begins to retrieve blanks 130 from the next available skid 140. Alternatively, the skids 140 themselves may be configured to detect a low quantity or empty skid. To accomplish this, each of the skids 140 includes a quantity detector assembly 145 adapted to determine whether the quantity of remaining blanks 130 is low or zero, or both, by using either a light sensor, a weight detector, or a video system, or some combination thereof. Upon determining a low or zero quantity, the detector assembly 145 signals either the first robot 120 or any of the control computers 105. In response, either the first robot 120 or any of the control computers 105 can take a selected skid 140 out of service and initiate retrieval of blanks 130 from the next available skid 140. For purposes of alerting supervisory personnel of the need to refill the empty skid 140, the detector assembly 145 can be adapted to also generate a visual, audible, or electronic alarm or signal. In a modification to the preferred embodiment, the quantity detector assembly 145 can be adapted for attachment to the manipulator 125 of the first robot 120 so that the detector assembly 145 detects low or empty skids 140 when it attempts to capture and retrieve the next blank from the skid.

For safety purposes, the first robotic feeder station 110 is substantially surrounded by a safety fence or partition 150 configured with light curtain assemblies or specially adapted doors, or both, to detect intrusions into the work area of the first robotic feeder station 110. The partition 150 incorporates a plurality of spaced apart light curtain sensors 155 operative to signal an alarm when an intrusion occurs. These types of sensors are commercially available from many vendors including Scientific Technologies, Inc. of Fremont, Calif. The alarm is selected to be either visual, acoustic, or electronic, or a combination thereof. The alarm, in turn, is configured to generate one or more resulting alerts. First, the alarm can visually or audibly warn an individual intruder or supervisory personnel of the presence of an intrusion into the potentially dangerous area adjacent to the first robot 120. Also, the alarm can electronically signal the first robot 120 or any of the control computers 105, or both, that an intrusion of the first robotic feeder station 110 has occurred. If an intruder has entered the first station 110 work area, then either the first robot 120 or one of the control computers 105, or both, can generate further alarms. The first robot 120 can also be configured to completely cease operation to prevent injury to the intruder. Similarly, any of the control computers 105 can be configured to stop the first robot 120 from operating, and can further stop the entire system 100 from operations so the intruder can safely exit the first station 110.

Additionally, the light curtain partition 150 includes spaced apart light curtain skid removal sensors 160 proximate to each of the feeder skids 140 of palletized blanks 135. The removal sensors 160 are configured to operate in cooperation with the quantity detector assemblies 145 and to communicate a skid removal alert signal to either the robot 120 or any of the control computers 105 when an operator approaches and engages any of the feeder skids 140 for removal of the empty or low quantity skid 140 and replacement with a full skid 140. When a skid 140 has already been identified as empty or low, the removal sensor 160 can be adapted to generate the skid removal signal or to remain silent. Also, even if the detector assembly 145 has not generated a skid low or empty alert signal, the skid removal sensor 160 is configured similarly to the detector assembly 145 to alert the first robot 120 or any of the control computers 105 that blanks 130 must be retrieved from the next available skid 140. Thus, an operator can easily remove and replace any skid 140 that is low or empty. When a skid removal alert signal is generated, the first robot 120 is configured to retrieve blanks 130 only from one of the other skids 140 of the plurality. In this way, the system 100 can continue full speed operations while empty or low skids are replaced with full skids.

As depicted in FIGS. 5 and 9, the system 100 may include a second robot feeder station 170 configured with some or all of the capabilities of the first robotic feeder station 110 including, for example, a second robot 175. For purposes of illustration but not limitation, the second station 170 is spaced adjacent to or apart from the first station 110. It can include, for example, each or combinations of the components, assemblies, and capabilities of the first station 110. The second station 170 is configured to retrieve a second sheet metal blank 180 from a plurality of palletized blanks 185 that are stored on a plurality of feeder skids 190. As before, the skids 190 have some or all of the elements of the feeder skids 140. The blanks 180 may have a thickness similar or dissimilar to the blanks 130.

Figure 8:
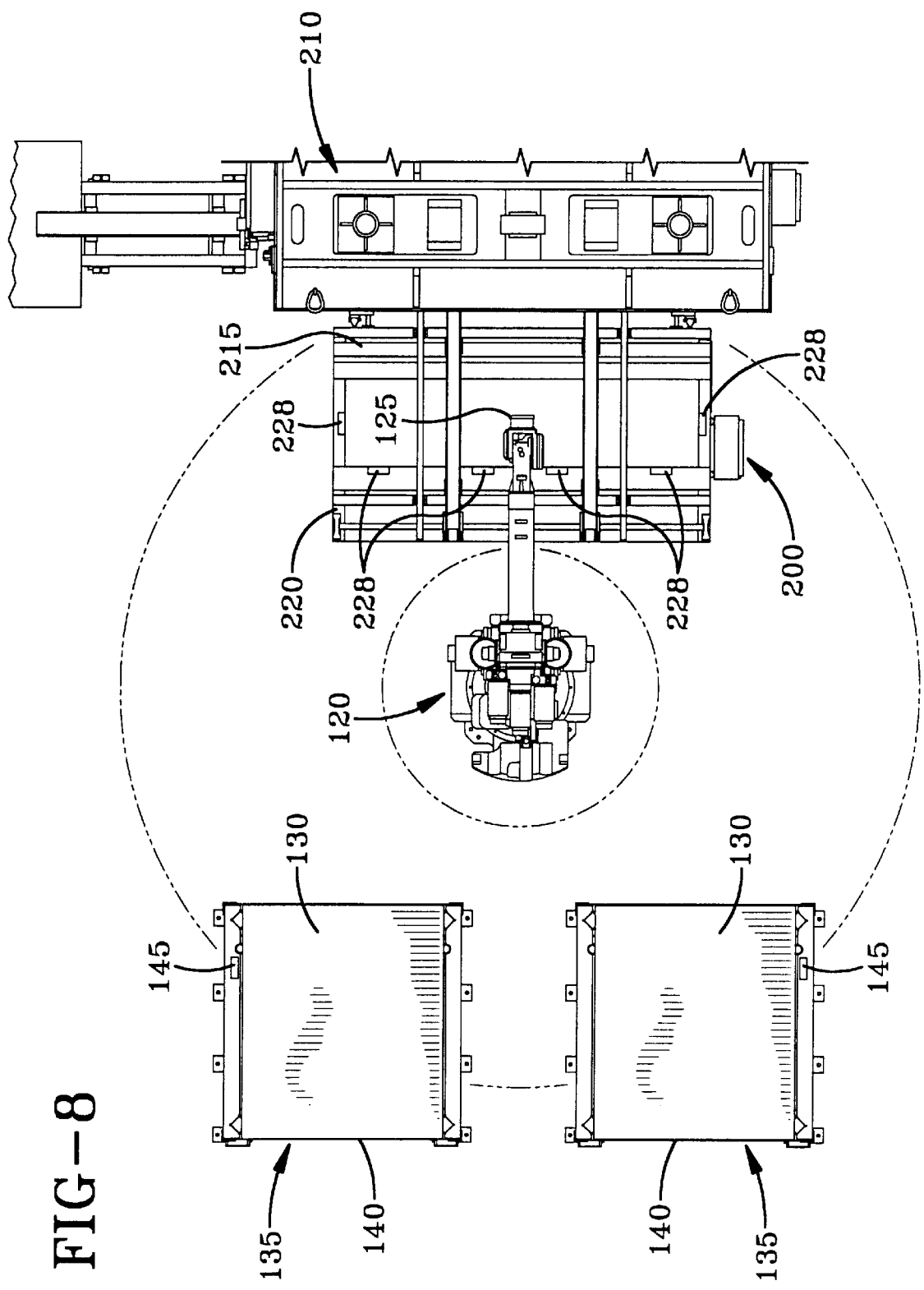
FIG. 8 is an enlarged view of a portion of FIG. 5 representing a plurality of the feeder skids, feeder robot arm, and light curtains of the manufacturing system of the present invention.

The one or more robotic stations 120, 175 are located proximal to a precision conveyer assembly 200 that incorporates a precision shearing machine 210, as can be understood with reference to FIGS. 5, 8, and 9. The precision conveyer assembly 200 may be configured with a substantially flat bed or a pre-shaped support jig 215 and plurality of precision sub-conveyers 220, 225 configured to precisely locate relative to one another, a plurality of work piece blanks such as blanks 130, 180. The precision conveyer 200 is adapted to releasably restrain the received blanks 130, 180 after they are received from the robotic feeder stations 110, 170. The restraint mechanism may include a plurality or combination of vacuum, magnetic, or clamping devices arranged on a conveyer bed 230 about the conveyer assembly 200 or sub-conveyers 220, 225 to releasably capture the blanks 130, 180. After receipt and capture of the blanks, the conveyer assembly 200 or sub-conveyers 220, 225 precisely position the blanks 130, 180 relative to each other and move them into a machining or shearing position proximal to the precision shearing machine 210. The conveyer assembly 200 or sub-conveyers 220, 225 each include actuatable locator assemblies 228 arranged about the conveyer bed 215 that are operative to engage or push against one or more of the exterior sides of the blanks 130, 180 to orient and position the blanks relative to each other and the shearing machine 210 with the joining edges of the blanks 130,180 arranged in a facing and substantially parallel relationship. The locator assemblies 228 are preferably actuated with air-cylinders or any or a wide variety commercially available industrial air, pneudraulic, and hydraulic systems. Many suitable conveyers having such positioning assemblies are available from a number of commercial suppliers and a magnetic conveyer suitable for use as the above configuration is available from VIL Magnetic Conveyers of Chicago, Ill.

The preferred precision shearing machine 210 includes dual shear dies or blades and corresponding platens (not shown) configured to simultaneously shear a portion of a joining edge from each of the blanks 130, 180. Each of the dies and corresponding platens incorporate precision machined outside corner edges that are precisely aligned with each other to impart a precision sheared edge on each of the blanks 130, 180. Each die and each platen can also be fabricated to include a plurality of precision machined edges so that the dies and platens may be removed, reversed or rotated, and replaced when one of the edges becomes worn or out of tolerance. In this way, each die and platen may be reused more than once before the outside corner edges of each die and platen must be remachined to restore the precision toleranced edge. Accordingly, each die and each platen can preferably include four precision machined edges. Alternatively, at least two precision machined edges are achievable. Each edge is machined to impart a precision sheared edge to each blank 130, 180 so that when positioned into an abutting relationship, the sheared edges are substantially in uniform contact with each other with a minimized gap therebetween of between approximately zero and 0.08 millimeters.

Preferably, between approximately 1 millimeter and approximately 10 millimeters are removed from the blanks. More preferably, between approximately 3 millimeters and approximately 5 millimeters are removed. Removal of this amount of material assures that enough material is removed to eliminate possible edge defects in the raw stock material. Also, removal of at least this amount of material ensures that a clean shear results with a minimized amount of possible tolerance anomalies. In turn, when the precision sheared edges are pressed together, the interface between the edges will be in substantially uniform contact with a correspondingly minimized gap therebetween. The use of dual shear dies and platens improves efficiency because shearing of both blanks 130, 180 is accomplished in a single step. However, a single die or blade is a suitable alternative for lower throughput applications. The preferred precision shearing machine 210 also automatically removes the sheared scrap from the machine before the blanks are transferred from the machine. For purposes of illustration only, and not for limitation, a suitable hydraulically operated, dual die, precision shearing machine is available from VIL of Chicago, Ill.

After shearing the joining edges of the blanks, the conveyer assembly 200 or sub-conveyers 220, 225 release and transfer the blanks 130, 180 to an idle or queuing station 230 as can be seen with reference to FIGS. 5 and 9. The queuing station 230 operates to temporarily store the sheared blanks before welding. In an alternative embodiment, not shown, the idle station 230 can be replaced with at least one transfer robot having some or all of the capabilities of the first and second robots 120, 175. By temporarily storing the sheared blanks 130, 180, another set of blanks may be retrieved, aligned, and sheared by the precision shearing machine 210.

LASER WELDER DISCLOSURE

Figure 6A:
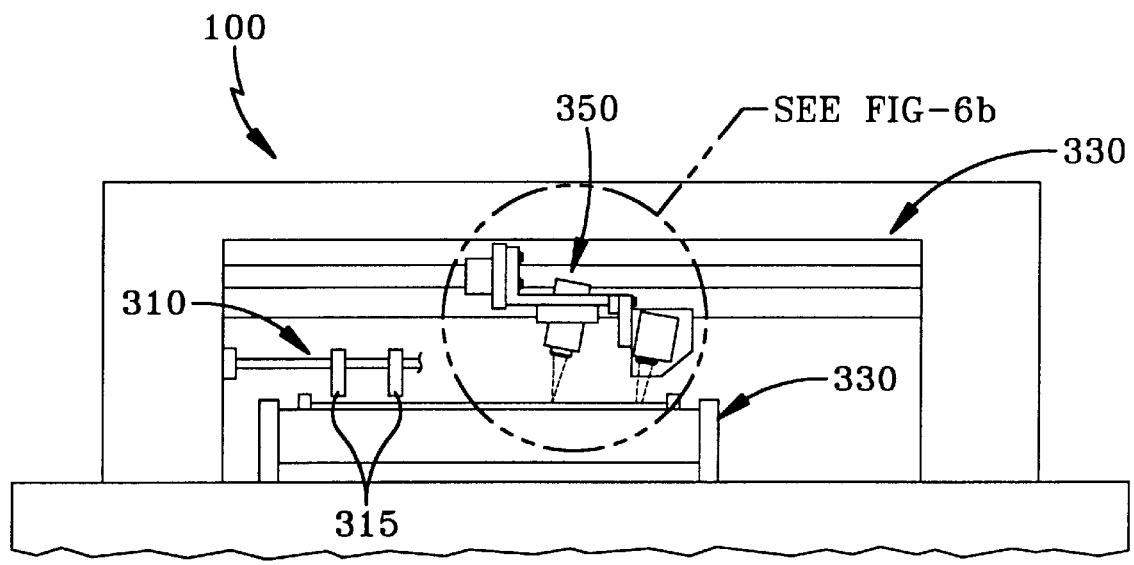
FIG. 6a is a schematic, rotated front-view taken along section line 6—6 of FIG. 5, in enlarged scale, of a representative laser welder gantry, a laser welder, and a laser weld inspection device.
Figure 6B:
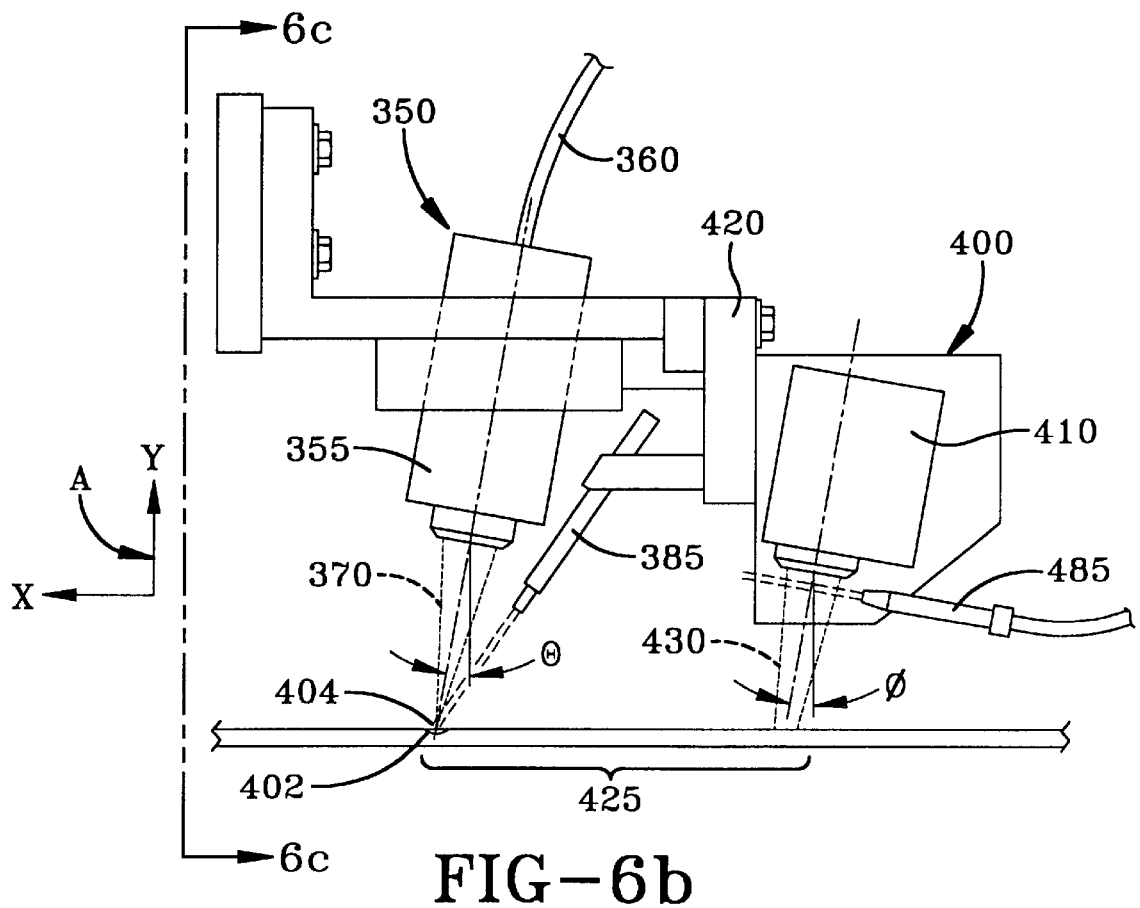
FIG. 6b is a detail view, in enlarged scale, of a portion of FIG. 6a and showing the leading angle component of the compound angle of the laser beam.
Figure 10:
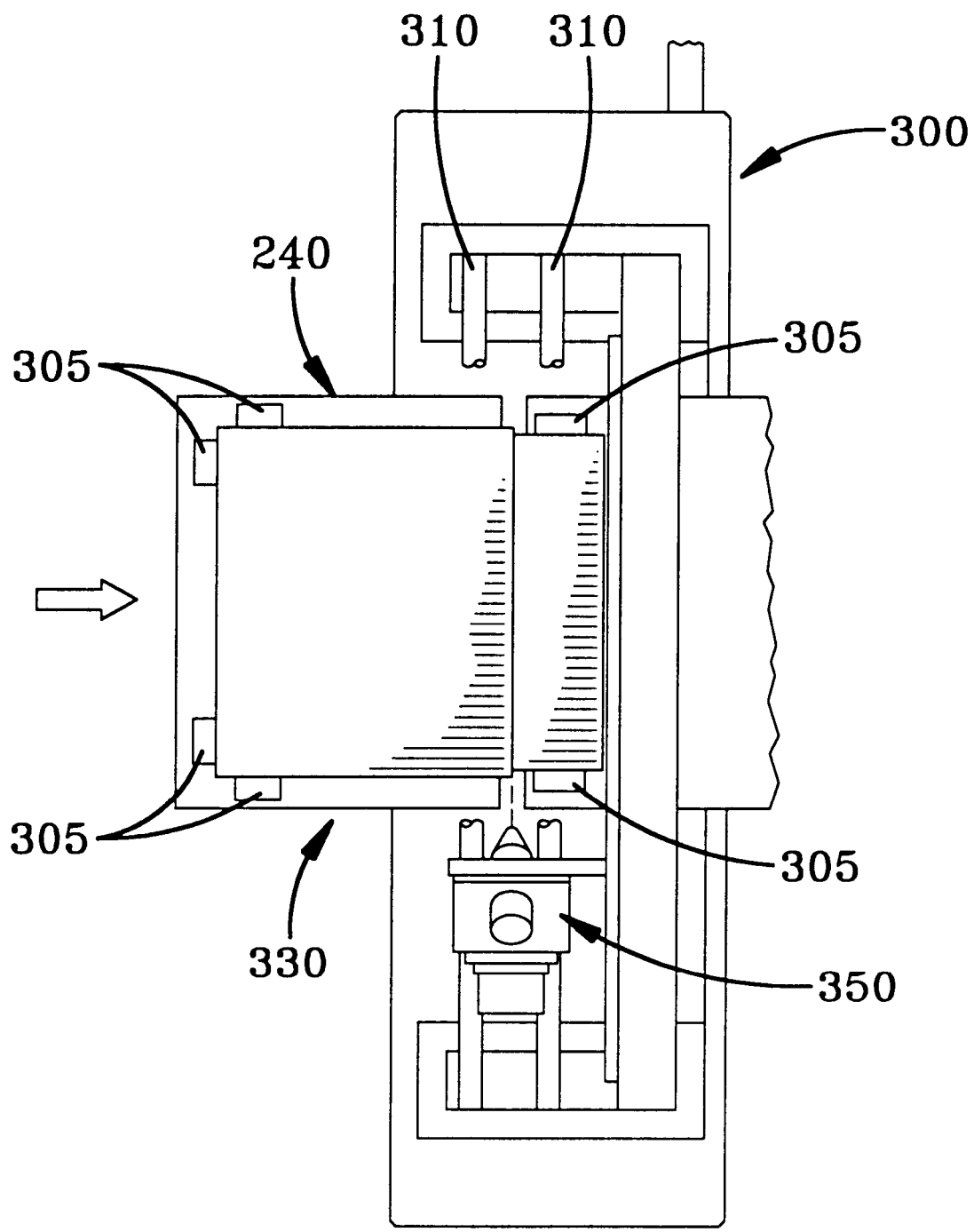
FIG. 10 is an enlarged view of a portion of FIG. 5 representing a second conveyer, a weld gantry, a laser weld head, and work piece locators of the manufacturing system of the present invention.

As illustrated in FIGS. 5 and 10, a second conveyor 240 slidably repositions the blanks 130, 180 and moves them from the idle station 230 onto a welding bed 330 of a laser welding gantry 300. To protect workers and other nearby equipment from injury due to reflected laser energy or plasma, sputter, and other debris, the laser welding gantry 300 is preferably enclosed. With reference also to FIGS. 5, 6a, and 6b, the gantry 300 incorporates a numerically controlled laser welder 350 configured to move across the gantry 300 and incorporating a laser weld head 355 and a laser weld inspection device 400. Although in some applications a self-contained laser could be used, the preferred embodiment of the present invention includes a laser weld head 355 that is powered by a remote laser unit 380 through a fiber optic cable 360 contained in a cable support tray 390.

The laser welding gantry 300 incorporates an automated position adjustment and orientation system having a plurality of pusher elements 305 retractably arranged on the second conveyer 240 about the laser weld bed 330. The pusher elements 305 are generally retracted down into the second conveyer 240 until the blanks are moved onto the laser weld bed 330. Once in place, the locator assemblies 305 are actuated and rise up to releasably engage the exterior edges of the blanks 130, 180, pushing the blanks into alignment so the precision sheared edges are registered substantially in parallel with each other and compressed into tight contact so that any gap between the precision sheared edges is minimized. Such locator assemblies can be similar in design to those employed by the precision conveyer 200. Once the edges are registered and in contact, a clamping mechanism 310, spanning substantially across the width of the gantry 300 above the welding bed 330, is deployed so a plurality of clamp members 315 clamp down on the blanks 130, 180 to hold them in place against the bed 330 during welding.

The laser welder 350 is movably attached to the welding gantry 300 and is preferably numerically controlled by an appropriately programmed computer that can include any of the control computers 105. The welder 350 is controlled to maintain a precise speed as it is moved across the gantry 300 during welding. The welder includes a laser weld head 355 that is connected by a fiber optic cable 360 to a remote laser power unit 380. With reference to FIGS. 2, 3a, 3b, 6a, 6b, 6c, and 7, it can be understood that the weld head 355 is configured to focus and project a laser beam 370 incident to and focused upon the minimized gap 38 between the precision sheared edges blanks 130, 180 to irradiate the region around the precision sheared edges to weld them together by forming a weld bead seam 40, 40'.

Many types of lasers are commercially available for various welding applications. For purposes of the present invention, however, it is preferable to use a single or dual cell (with corresponding single or dual optical fibers), solid, non-pulsed, continuous laser such as a neodymium doped, hard synthetic yttrium aluminum garnet laser (Nd-YAG). Preferably, the laser has output power rating of at least approximately 2.5 to approximately 3.0 kilowatts, and is preferably capable of generating a power output at the laser weld head 355 of at least approximately 2.3 to approximately 2.8 kilowatts, and more preferably a laser weld head 355 output of approximately 2.4 kilowatts. A suitable Nd-YAG laser includes the Model LW-8 Laser Blank Welder available from Lumonics, Inc. of Livonia, Mich. Similarly powered gas and pulsed lasers can be used provided that they are capable of producing the specified power ranges. Although a single cell, single fiber laser is represented by the figures, a dual cell laser will be equally effective and will increase the throughput of the laser welder 350 accordingly.

A gas jet 385 is also part of the laser welder and the gas stream is directed in the forward direction following the direction of the travel of the laser beam 370 and onto the region of the edges being irradiated by the beam. The gas jet 385 produces a jet stream that reduces and ideally eliminates gaseous contamination of the weld and to minimize plasma shielding effects. The gas jet is preferably any of a number of inert gases including, for example, argon, helium, or nitrogen, and can also be directed against the underside of the weld region for additional protection of the weld. The forward direction of the resultant jet stream also "blows" the plasma cloud and other welding debris forward and away from the laser weld head 355 and its associated and proximate components including the inspection device discussed below.

Figure 6C:
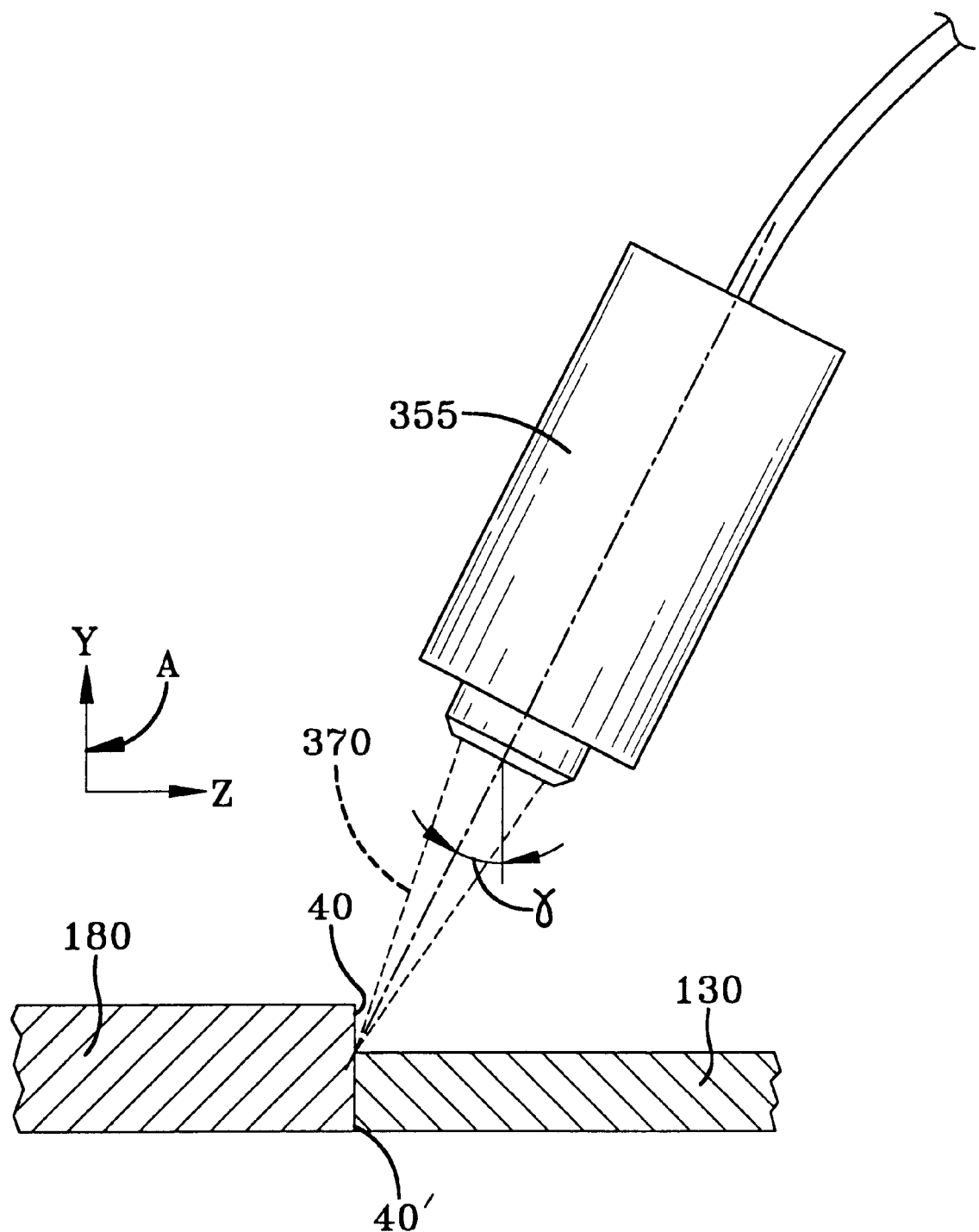
FIG. 6c is a section view taken along line 6c—6c of FIG. 6b and showing the leaning angle component of the compound angle of the laser beam.

With particular reference to FIGS. 6b and 6c, it can be seen that the laser beam 370 is focused to intersect the seam or interface 40 of the blanks and to irradiate their upper surface. The beam 370 projects at a compound angle to the vertical direction perpendicular to the surface of the blanks 130, 180. The compound angle includes "leading" and "leaning" components. The vertical direction is represented by the "Y" direction of the reference coordinate system labeled "A" in FIGS. 6b and 6c. The "X" direction represents the forward direction of the incident laser beam 370 across the gantry 300 during welding. With reference to FIG. 6b, the laser beam 370 leading angle component is labeled "θ" (theta) and it is measured from the direction of the "Y" axis. Preferably, the leading angle, θ, is between approximately 5 degrees and 15 degrees, more preferably between 7 and 12 degrees, and is most preferably approximately 10 degrees.

The leading angle serves several important functions. First, the leading angle, θ, prevents reflection of incident laser energy back into the laser weld head 355 and, in turn, into the laser unit. Next, leading angle θ allows the laser weld head 355 to lag the point on the surface where welding occurs. This protects the weld head 355 from contacting the plasma cloud and weld spatter and debris during welding. Third, leading angle θ changes the shape of the laser beam spot that irradiates the weld seam region. Ordinarily, the weld beam spot would be a circle if the beam was perpendicular to the work piece surface. However, a circular weld spot creates a very high energy density that creates welding problems that are difficult to control by adjusting the speed of travel of the laser beam 370. Thus, it has been found that by imparting an angle from the perpendicular to the incident direction of the laser beam 370, the laser beam spot will achieve an elliptical shape on the irradiated surface with the major elliptical axis substantially parallel to the direction of travel of the laser beam spot or the X direction of FIG. 6b. In turn, the elliptical shape reduces the energy density on the irradiated surface by spreading it over a larger area. The reduced effective energy density of the laser beam spot allows better control of the welding process by variance, for example, of a single welding parameter such as the speed of travel of the laser beam spot across the weld seam. Such techniques are described in a number of U.S. Patents including, for example, U.S. Pat. No. 5,595,670 to Mumbo-Caristan which is hereby incorporated by reference in its entirety.

With reference to FIG. 6c, the reference coordinate system A describes the same Y direction as depicted in FIG. 6b. The "Z" direction points in the lateral direction of the blanks 130, 180 (the Z direction is directed up and out of the plane of FIG. 6b). In FIG. 6c, the X direction is directed up and out of the plane of the view. The leaning angle component of the compound laser beam angle is labeled "γ" (gamma). Preferably, angle γ is between approximately 1 and approximately 10 degrees, more preferably between 3 and 7 degrees, and is most preferably approximately 5 degrees. The leaning angle γ serves to further impart an elliptical shape to the laser beam spot with the major elliptical axis due to angle γ substantially perpendicular to the direction of beam spot travel and the X direction of FIG. 6b. When welding blanks of substantially similar thickness, the beam spot is focused and positioned to irradiate substantially equal regions of the blanks on both sides of the weld seam. However, when welding blanks of substantially dissimilar thickness, the leaning angle γ is configured to precisely position approximately between 15 percent and 30 percent, and more preferably approximately 25 percent of the cross-sectional area of the elliptical laser beam spot upon the protruding vertical face of the thicker blank (see reference numeral 35 of FIG. 2). It will be understood that the remaining portion of the beam spot will irradiate the thinner blank.

With these desired leading and leaning angles, the preferred speed of travel of the laser beam spot across the blanks, as controlled by the speed of the laser welder 350, that creates the optimum weld bead seam is preferably between approximately 4 and approximately 10 meters per minute, and more preferably approximately 7 meters per minute. These welding parameters have been used to create a welded work piece wherein the welded seam is at least 30 inches in length and has a tensile, pull strength exceeding approximately 9,000 pounds.

These angles and speeds were empirically derived and are based upon extensive trial and error experimentation because no data existed as to how the Nd-YAG laser would perform in welding dissimilar thickness materials at speeds greater than that possible with the prior art gas, pulsed, and $CO_2$ lasers. The preceding parameters have thus been discovered to significantly minimize laser weld anomalies, such as burn-through, cracking, and pores.

INSPECTION SYSTEM DISCLOSURE

The laser welding system 100 also preferably incorporates a laser weld inspection and quality control device 400, as represented in FIGS. 6a and 6b, which is mounted to cooperate with the laser welder assembly 350 of the gantry 300. In FIGS. 6a and 6b, the laser welding inspection device 400 is shown mounted to the gantry 300 to move along with the laser welder 350 during the welding operation.

As the laser weld head 355 projects the laser beam 370 to irradiate the seam 40 between the work pieces 130, 180, a molten weld pool 402 is generated at the focal point 404 of the laser beam 370. As the laser beam 370 and weld pool 402 traverse the seam 40, a weld bead is created. The laser weld inspection device 400 utilizes an image capturing device, namely a visual sensor 410, such as a CCD (Charge Coupled Device), or a high shutter speed video camera. For purposes of illustration, and not limitation, an example of a visual sensor 410 is the model MVS-5 camera from Modular Vision Systems of Montreal, Canada. Preferably, the visual sensor 410 is mounted rearward of the laser weld head 355 using a structure such as a camera mounting bracket 420, although in an alternative embodiment of the present invention, the visual sensor may be self-propelled and have its own support structure. The visual sensor 410 is focused on the welding path, at a predetermined distance 425 behind the laser's current focal point 404. The distance 425 between the focal point of the laser 404 and the focal point of the visual sensor 430, is selected so that the images captured by the visual sensor 410 will reflect a fully solidified weld bead. In the preferred embodiment of the invention, the distance 425 is between approximately 75 millimeters and approximately 200 millimeters, and more preferably between approximately 100 millimeters and approximately 200 millimeters. Even more preferably, the distance 425 is about 150 millimeters. The visual sensor 410 is also mounted at a specific angle "ø" (phi), preferably between approximately 5 and approximately 10 degrees toward the direction of travel, labeled as the X direction in the figures. In the preferred embodiment of the invention, the visual sensor 410 has a field of view of approximately 5 millimeters by approximately 5 millimeters, although the field of view may be altered based on the size of the weld to be inspected.

The visual sensor 410 is configured to capture images of the weld bead at predetermined time intervals based on considerations such as the linear velocity of the laser weld head 355 and the particular features of the weld bead to be inspected. In one preferred embodiment of the present invention, the visual sensor 410 captures approximately one image per every 4 millimeters of travel while moving at a linear velocity of approximately 6 meters per minute.

A representative cross-sectional view of a weld to be inspected is shown in FIG. 3a. The blanks 130, 180 are selected to be of dissimilar thickness and are fabricated from a material such as, for example, steel sheet metal blanks. The blanks, are joined through a seam whose length is normal to the surface of the paper. The blanks 130, 180 are joined by welding using the laser welder 350. The intense heat of the laser beam 370 creates a melt zone 440 as it contacts the seam 40 between the blanks. As this melt zone cools, the weld bead 445, 450 forms on both the top and bottom surfaces of the welded work piece.

Figure 7:
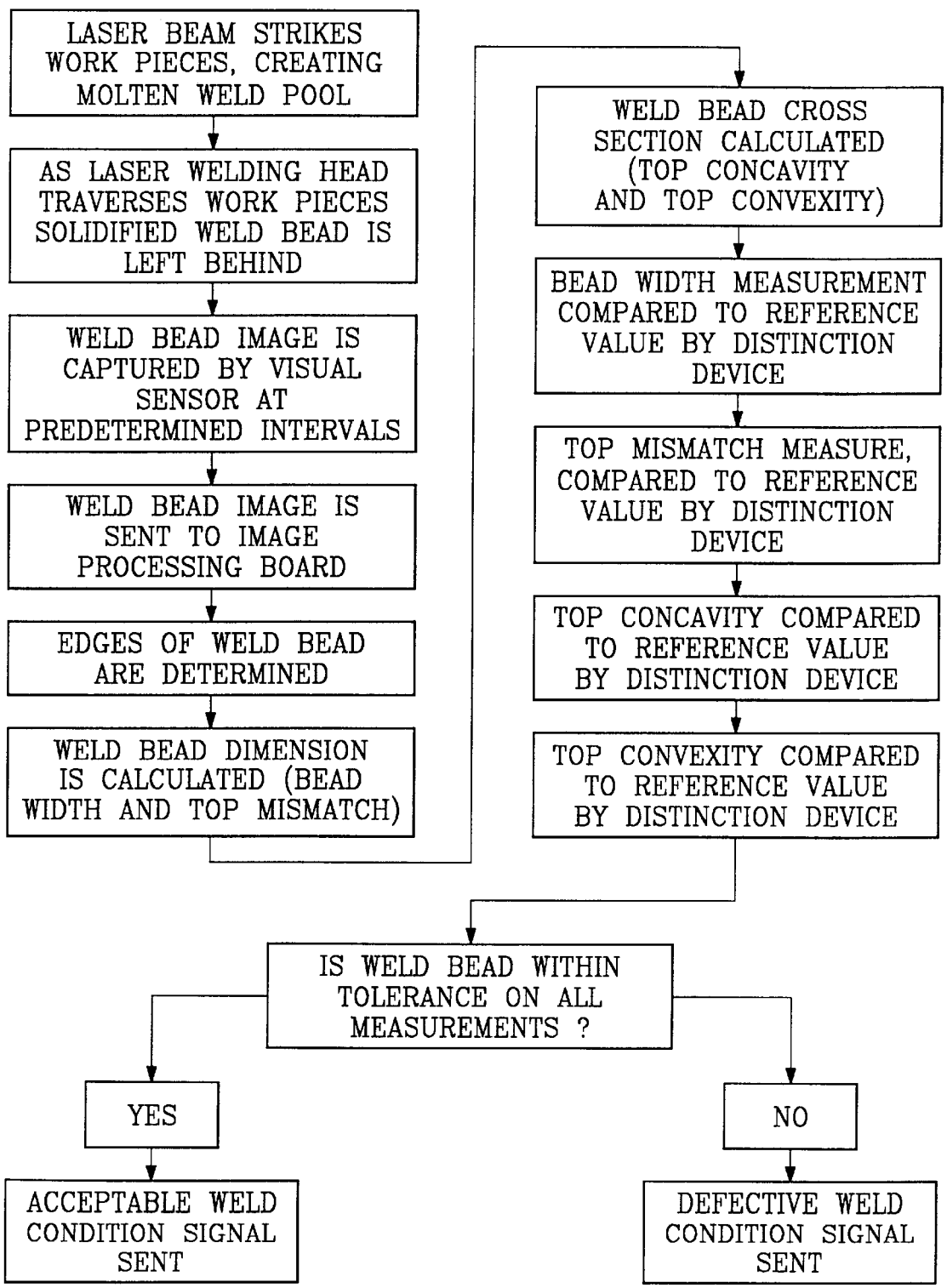
FIG. 7 is a flow diagram representative of an exemplary embodiment of the comparison procedure used by the control computers or the laser weld inspection device, or both, of FIGS. 5,6a, and 6b.

FIG. 7 describes a representative comparison procedure that is included in the system software of the present invention. As the laser weld head 355 follows the seam, the visual sensor 410 trails directly behind, viewing an image of the fully formed weld bead 445 at predefined intervals. The images captured by the visual sensor are electronically communicated to a selected computer, such as one of the control computers 105, that incorporates an image processor having image processing hardware or software, or both. The image processor first analyzes the image to determine the edges of the weld bead. The image processor then measures the image in several preselected dimensional areas, which will be described in detail below. The image is first measured for bead width A and top mismatch B, (FIG. 3a). After bead width A and top mismatch B are calculated, the image processor measures the image for top concavity C and top convexity D. The selected computer, or any of the other control computers 105, or both, also include a distinction device that incorporates an image coprocessor having hardware or software components, or both, and in electronic communication with the image processor. The distinction device cooperates with the image processor to compare the values of bead width A, top mismatch B, top concavity C, and top convexity D with corresponding. reference images or values, or both, that represent the values of acceptable weld parameters and dimensions.

Once the comparison of each selected dimensional area is complete, the distinction device determines the quality of the weld and whether the welded work piece should be accepted or rejected. If it is determined that the selected characteristics of the weld bead image are within the limits of the predetermined, acceptable weld parameters and dimensions, a signal is generated classifying the weld as acceptable. If it is determined that the image is outside the predetermined, acceptable weld parameters and dimensions, a signal is generated classifying the weld as rejected. The signal may also be used to initiate the next appropriate machine process step to be performed on the welded part. For example, the signal may be sent to the removal station 510 described below and the articulating arm robot 520 for removal to an accepted work piece skid 530 or a rejected work piece skid 540.

As described in the procedure of FIG. 7, in a preferred embodiment of the invention, the captured images and the reference images are analogized in four specific dimensional areas Referring again to FIG. 3a, these dimensional areas are depicted as bead width A, top mismatch B, top concavity C, and top convexity D.

Bead width A is the distance between the two limit points defining the edges of the weld bead 445, measured along an axis perpendicular to the length of the seam on the top surface of the work pieces 130, 180.

As shown in FIG. 3a, the work pieces 130, 180 are preferably aligned to have each of their bottom surfaces in the same plane. If the work pieces are of substantially dissimilar thickness, then top mismatch B will exist as the difference in height between the top surface of one blank 130, and the top surface of the other blank 180. Although top mismatch B is depicted in the preferred embodiment of FIG. 3a, the work pieces may also be of substantially equivalent thickness, with both their top and bottom surfaces lying in the same plane. In this case, mismatch between the adjoining work piece surfaces would be negligible.

The images are also compared for top concavity C, which is the maximum depth to which the weld bead 445 has sunken, measured from the top surface of one of the blanks or the thinner blank 130, if they are of dissimilar thickness. The reference surface for purposes of the top concavity C measurement may change based upon the alignment and thickness of the work piece blanks 130, 180.

The fourth dimensional area selected for purposes of comparison is top convexity D. Top convexity D is the maximum height of the weld bead 445, measured from the top surface of the blanks or the top surface of the thicker blank 180 if blanks of dissimilar thickness are used. Like top concavity C, the reference surface for purposes of the top convexity D measurement may change based upon the alignment and thickness of the work pieces 130, 180.

In an embodiment denoted in FIG. 3a, all images of the weld bead 445 are generated by the visual sensor 410 from above the work pieces. However, it should be understood that it is also possible in another embodiment of the invention, to utilize an additional visual sensor for viewing the portion of the weld bead 450 formed along the bottom surface of the work pieces 130, 180. Additional dimensional comparison areas may also be included in the weld bead analysis. These additional comparison areas, as denoted in FIG. 3a, may include root width E, bottom concavity F, and bottom convexity G. Further, an additional visual sensor may be incorporated for use in a dual-cell laser configuration of the present invention so that more than one segment of the weld bead may be inspected in cooperation with each of the dual laser weld heads. Root width E is the distance between the two limit points defining the edges of the weld bead 450, taken along an axis perpendicular to the length of the seam on the bottom surface of the work piece.

As illustrated in FIG. 3b, the blanks 130, 180 may be aligned so neither their respective top nor bottom surfaces lie in the same plane. In this circumstance, bottom mismatch H will occur as the difference in height between the bottom surface of one blank, and the bottom surface of the other blank. Bottom mismatch may also be selected as a dimensional comparison area.

Referring again to FIG. 3a, bottom concavity F is shown as the maximum depth of the weld bead 450 below the bottom surface of the work pieces 130, 180. The maximum height of the weld bead 450 as measured from the bottom surface of the work pieces may also be checked. This measurement is defined as bottom convexity G.

The selected dimensional comparison steps are described above in an exemplary sequence representative of the preferred embodiment of the present invention. However, any sequence of the above steps is equally satisfactory and the preceding description is presented for purposes of illustration but not limitation. Moreover, the exemplary procedure setting forth the comparison and analysis steps is not limited to any particular number or combination of dimensional areas described above. Additional inspection steps may be added, and existing steps may be removed without departing from the scope of the invention.

New reference images may be created that adopt existing dimensional comparison areas, create new areas, or utilize combinations of both. A reference image may have adjustable tolerance zones which can be set for each area of dimensional comparison. In this manner, distinct reference images can exist for use under particular conditions.

A visual display monitor, such as is well known, may be connected to the image processing board or any of the control computers 105, or both, to display the weld bead image captured by the visual sensor 410. An additional monitor may be connected to display, for example, the reference image or dimensional comparison area tolerance zones using graphic overlays of the predetermined parameters. The system may also employ a communication board to send signals to other equipment, such as, for example, any of the control computers 105, as dictated by the results of the weld bead analysis and for purposes of archiving captured images for future analyses and comparisons.

In the present invention, a clear image of the weld bead is critical. Therefore, it is necessary to safeguard the visual sensor 410 from contamination. Although the visual sensor 410 is maintained at a preselected distance 425 (FIG. 6*b*) rearward from the laser weld head 355, the visual sensor 410 is sufficiently proximate the weld pool 402 to be affected by plasma, weld spatter, and other debris. Plasma, smoke and particles of liquid metal (spatter) that are emitted from the weld pool 402 during the welding process, may migrate to, and damage the visual sensor 410. Therefore, a means for preventing such damage is preferably utilized. In one preferred embodiment of the invention, a compressed air stream 485 is employed to pass across, and deflect any errant debris away from the visual sensor. Other methods such as the gas jet 385 used with the laser weld head 355, filters or vacuum means, for example, may be applied to perform an equivalent function.

Figure 11:
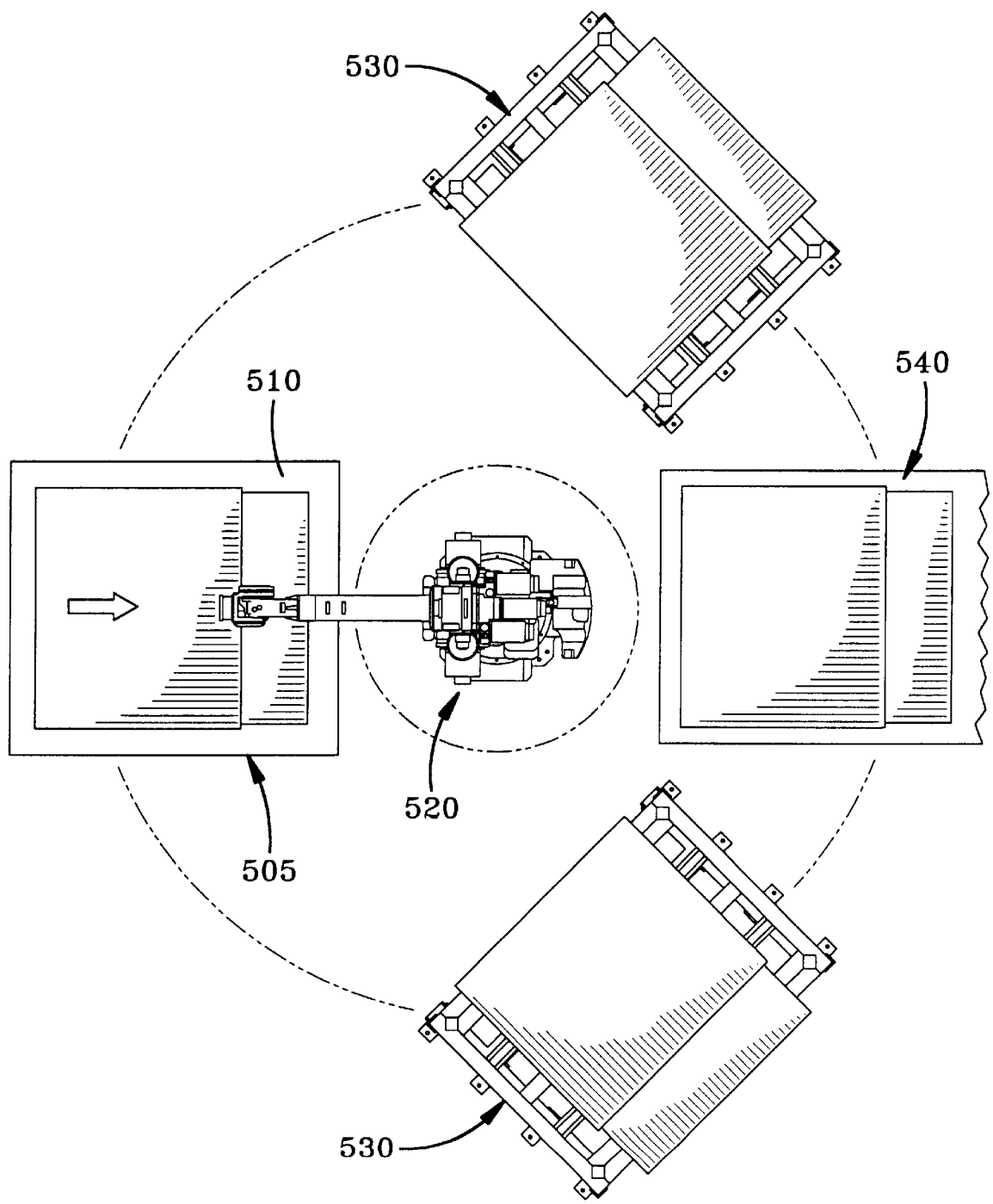
FIG. 11 is an enlarged view of a portion of FIG. 5 representing an exit conveyer, an exit robot arm, and a plurality of accepted work piece skids and a rejected work piece skid of the manufacturing system of the present invention.

With reference to FIGS. 5 and 11, an exit conveyer station 500 is depicted as part of the automated welding system 100. The station 500 includes an exit conveyor 505 that cooperates with the second conveyor 240 to transfer the welded work piece from the laser welding bed 330 to a removal station 510. The removal station can include another articulating arm robot 520 that is similar in design to and can include any or all of the features of the robots 120, 175 already described. Depending on whether the welded work piece has been accepted or rejected during the inspection of the laser weld, the removal robot 520 will remove the work piece from the exit conveyer 505 and put it onto one of a plurality of accepted skids 530 or on a reject skid 540. Since the quantity of rejected parts is likely to be very small and since it may be desirable to immediately remove and inspect any rejected work pieces, it may not be necessary to put the rejected pieces on a skid. In such a case, 540 may be replaced by a gravity roller conveyor or other means for removing the work piece from the automated welding system 100. For worker safety, the exit conveyor station 500 is configured similar to the feeder station 110 and is surrounded with a safety fence or partition 545 configured with light curtain assemblies or specially adapted doors, or both, to detect intrusions into the work area of the exit station 500. Additionally, the accepted skids or the rejected skids, or both, are surrounded by light curtains 555 having the same capabilities described with respect to the feeder station 110.

INDUSTRIAL APPLICABILITY

From the foregoing, it can be appreciated that the present invention fulfills a real but heretofore unmet need for a structurally improved welded work piece that is less expensive to manufacture, includes fewer parts, and is lighter in weight. The present invention also fulfills the need for a method for manufacturing such a welded work piece that overcomes the undesirable features, deficiencies, and shortcomings of presently available welded work pieces and methods for their manufacture. The invention fulfills these needs of the automotive industry through the novel design of a welding gantry that comprises a laser beam aimed at a compound angle, to irradiate the pieces to be welded. The welding gantry may also comprise an inspection device that travels with the laser welder during the welding operation. The inspection device captures images of the weld bead and transmits those images to an image processing board. Various weld bead parameters are then compared to reference values by a distinction device. If the weld bead is within tolerance on all parameters, the work piece is considered accepted and moved to an accepted work piece skid. If the weld bead is not within tolerance on all parameters, the work piece is considered rejected and moved to a rejected work piece skid. The welding gantry may also comprise protection means for the welding head and/or the inspection device, such as gas streams.

The invention also fulfills the needs of the automotive industry for improved work pieces through the use of an automated system that comprises robots for the transport of sheet metal blanks to a conveyor system, a conveyor system, a precision shearing device, a laser welding gantry, and robots for the transport of welded work pieces from the conveyor.

Each of the described embodiments and variations, as well as other obvious yet undescribed embodiments of the invention, and equivalents thereof, may be used either alone or in combination with each of the other embodiments. While particular preferred embodiments of the invention have been illustrated and described, various modifications and combinations can be made without departing from the spirit and scope of the invention, and all such modifications, combinations, and equivalents are intended to be covered and claimed.

What is claimed is:

1. A laser welder for welding a pair of work pieces of dissimilar thickness, comprising:

a laser weld head configured to movably project a laser beam onto a minimized gap formed between a pair of adjacent, substantially flat and substantially horizontally-oriented work pieces of dissimilar thickness formed with respective precision sheared edges that are positioned in an abutting relationship and are exposed to the laser weld head, which is operative to weld the precision sheared edges by forming a weld bead seam therebetween;

wherein the laser beam is incident on the gap with a compound angle, measured relative to the vertical direction substantially normal to the work pieces, that includes a leading angle component substantially in the direction of movement of the laser weld beam and a leaning component substantially in the direction normal to the gap and leaning towards one of the work pieces away from the vertical direction; and wherein the laser beam is focused upon the work pieces to have between about 70% and about 85% of its cross-sectional area incident upon the thinner work piece.

2. The laser welder according to claim 1 wherein the laser beam is moved along the gap to form the weld bead seam at a speed of between approximately 4 and approximately 10 meters per minute.

3. The laser welder according to claim 1 wherein the laser beam is moved along the gap to form the weld bead seam at a speed of approximately 7 meters per minute.

4. The laser welder according to claim 1 wherein the leading angle component is between approximately 5 degrees and approximately 15 degrees.

5. The laser welder according to claim 1 wherein the leading angle component is approximately 10 degrees.

6. The laser welder according to claim 1 wherein the leaning angle component is between approximately 3 degrees and approximately 7 degrees.

7. The laser welder according to claim 1 wherein the leaning angle component is approximately 5 degrees.

8. The laser welder according to claim 1 wherein the laser beam is focused on the work pieces to have approximately 75% of its cross-sectional area incident upon one side of the gap and on one of the work pieces.

9. The laser welder according to claim 1 wherein the minimized gap is between approximately zero and 0.08 millimeters.

10. The laser welder according to claim 1 wherein the minimized gap is approximately 0.04 millimeters.

11. The laser welder according to claim 1 wherein the laser beam is energized by a non-pulsed, continuous laser.

12. The laser welder according to claim 11 wherein the laser beam is energized by a Nd-YAG laser.

* * * * *